Feb. 10, 1942.  J. M. KENNEDY ET AL  2,272,609
COPPER COATED COOKING VESSEL
Filed Nov. 12, 1938  4 Sheets-Sheet 1
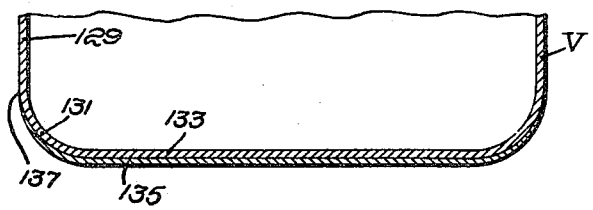
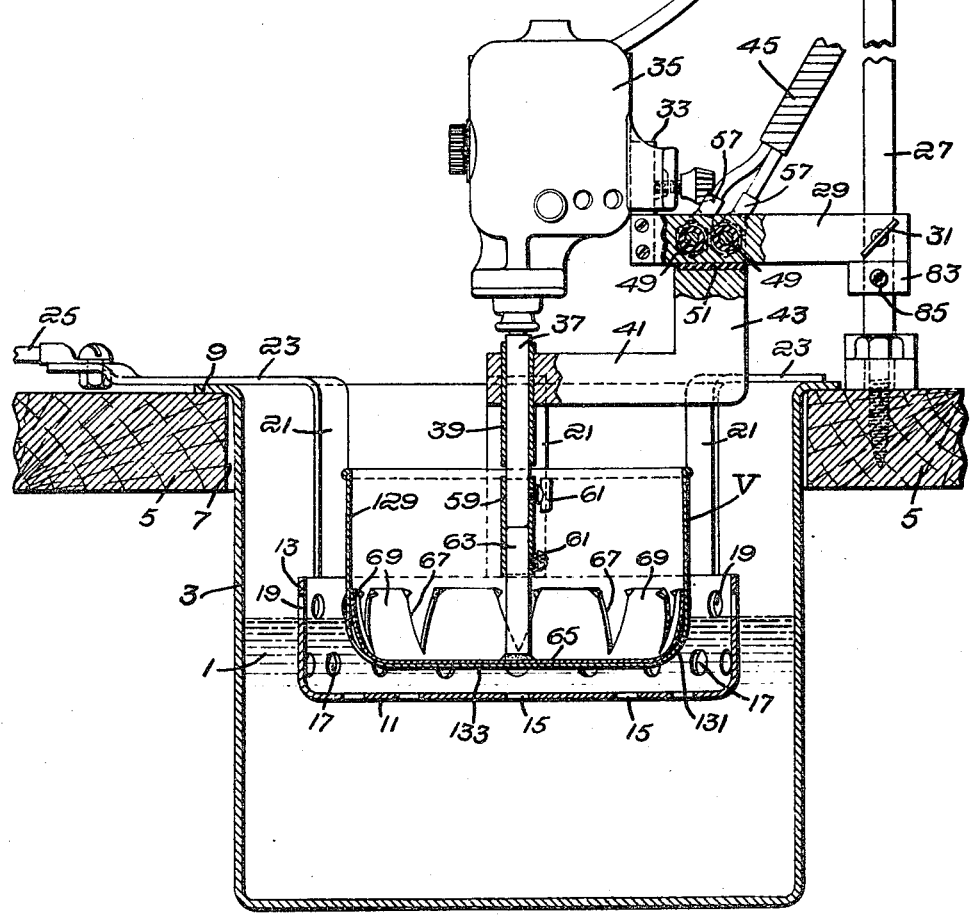
Inventors:
James M. Kennedy,
Arthur P. Knight,
Harold J. Lee, Feb. 10, 1942. J. M. KENNEDY ET AL 2,272,609
COPPER COATED COOKING VESSEL
Filed Nov. 12, 1938  4 Sheets-Sheet 2
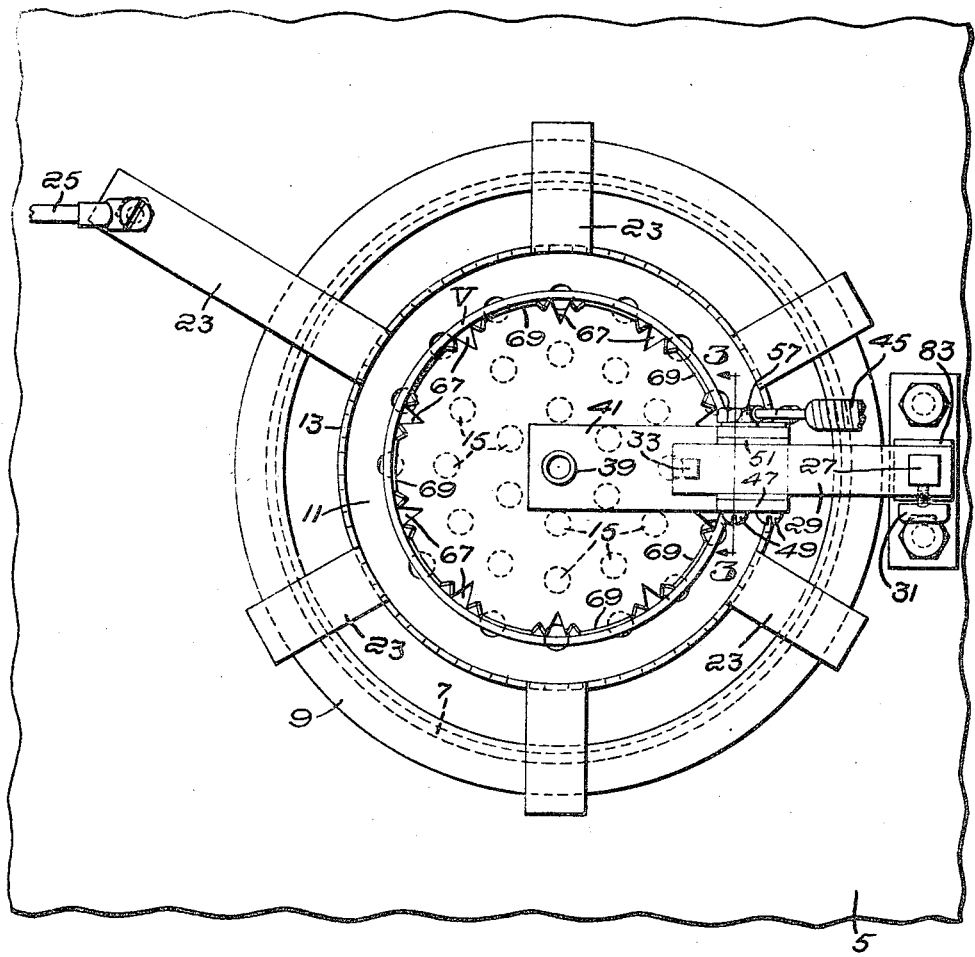
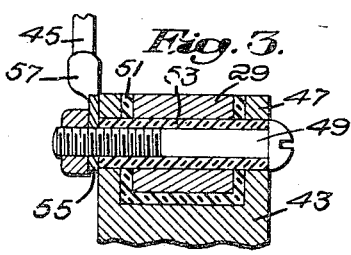

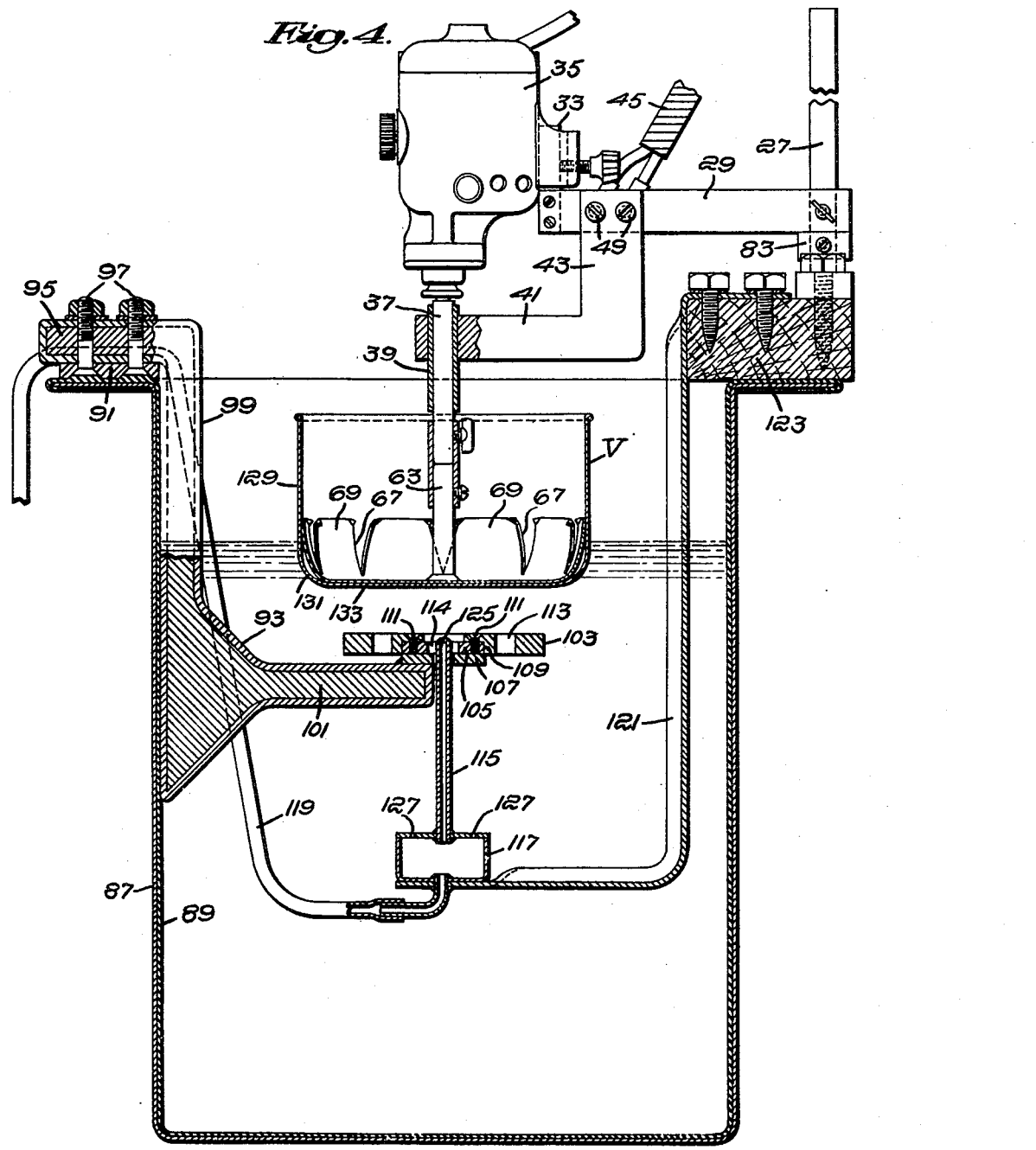

Feb. 10, 1942.　　J. M. KENNEDY ET AL　　2,272,609
COPPER COATED COOKING VESSEL
Filed Nov. 12, 1938　　4 Sheets-Sheet 4

Inventors:
James M. Kennedy,
Arthur P. Knight,
Harold J. Lee,
by Emery Booth Townsend Miller & Weidner
Attys.

Patented Feb. 10, 1942

2,272,609

UNITED STATES PATENT OFFICE 2,272,609

COPPER COATED COOKING VESSEL

James M. Kennedy, Arthur P. Knight, and Harold J. Lee, Rome, N. Y., assignors to Revere Copper and Brass Incorporated, Rome, N. Y., a corporation of Maryland Application November 12, 1938, Serial No. 240,060

1 Claim. (Cl. 53—1)

This application is a continuation-in-part of our co-pending application Serial Number 182,482, filed December 30, 1937.

Our invention relates to plated stainless steel articles, particularly but not exclusively to stainless steel cooking utensils having an electro-deposited coating of copper for distributing the heat.

The invention, which has among its objects the provision of a stainless steel cooking vessel having on its bottom a strongly adhering copper layer for distributing uniformly to the stainless steel the heat exteriorly applied to said bottom, will be best understood from the following description when read in the light of the accompanying drawings.

In the drawings—

Fig. 1 is an elevation, with parts in section, of apparatus for use in preparing the surface of a stainless steel article for electro-depositing thereon a layer of copper or other metal;

Fig. 2 is a plan of the apparatus according to Fig. 1 with the motor omitted;

Fig. 3 is a section on the line 3—3 of Fig. 2 with parts omitted;

Fig. 4 is an elevation, with parts in section, of apparatus for use in electro-depositing a coating of copper or other metal on the article;

Fig. 7 is a vertical diametric section of the bottom portion of the finished article, the thickness of the metals being exaggerated.

Figure 5:
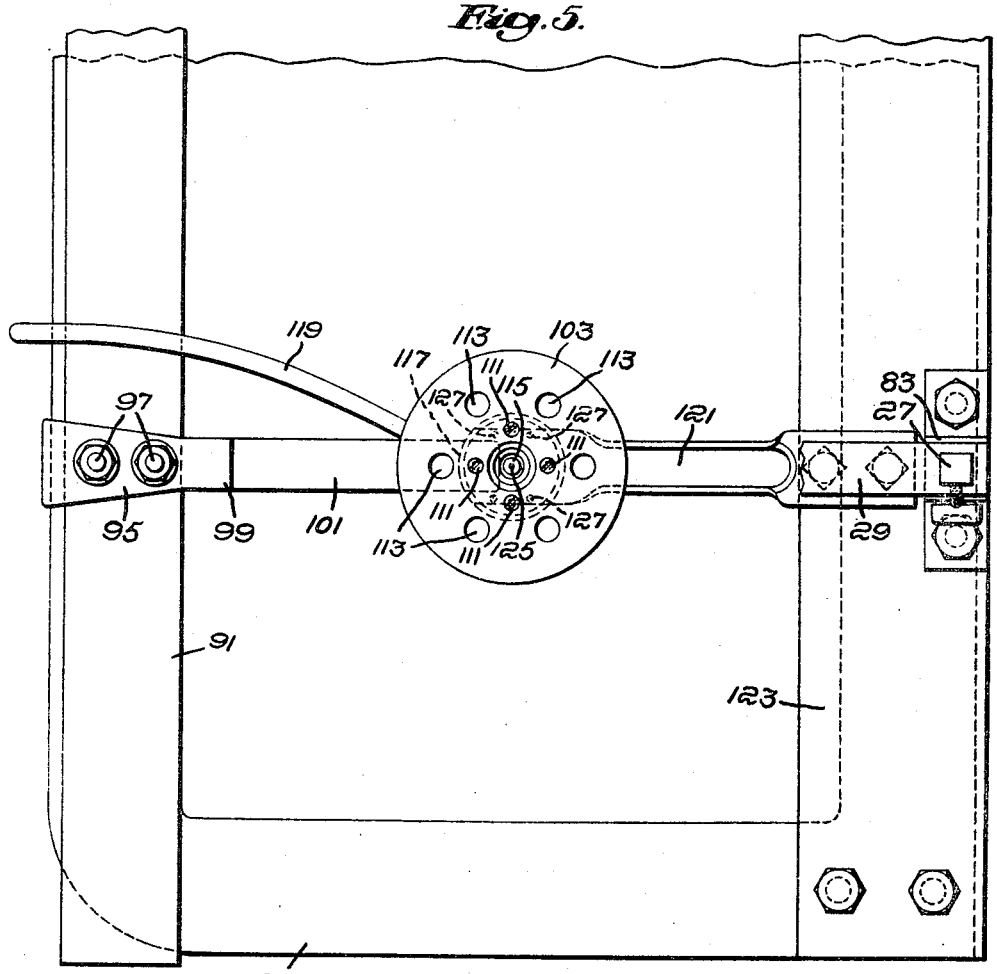
Fig. 5 is a plan of a fragment of the apparatus according to Fig. 4 with the motor and article, and support therefor, omitted.

The apparatus illustrated is particularly adapted for electro-depositing a copper layer on the bottom surface of cooking vessels made of stainless steel, that is to say, iron, or iron-nickel alloy, containing sufficient chromium to make it stainless and corrosion resistant, and commonly small amounts of other metals present as impurities or added for improving the chemical and physical properties of the alloy.

It will be understood that stainless steel, although presenting a desirable material in respect to its resistance to the corrosive action of foods, is unsatisfactory for cooking vessels such as frying pans, pots, and the like, for the reason that it is not only a relatively poor conductor of heat but conducts the heat non-uniformly in respect to different portions of its surface area presented to the source of heat. For example, if it is attempted to cook batter in a stainless steel frying pan to produce a "pancake," no matter what cooking temperature is employed the pancake will burn in spots before the portions between these spots will show any particular evidence of being cooked. To overcome this difficulty it has been proposed to provide the under side of the bottom of a cooking vessel with a layer of copper or other material of high heat conductivity so as to distribute the heat over the surface of that bottom. The apparatus and methods herein described are particularly useful in forming such a layer by electro-deposition on the bottom of a cooking vessel. It will be understood, however, that the apparatus and methods described are not limited to use in connection with cooking vessels, but may be employed in connection with electro-depositing copper on any sort of stainless steel article.

In the practice of the method the surface to be plated is preferably first treated to clean it of grease. As suitable for this purpose applicants have found as satisfactory a solution which contains for each gallon of water 0.5 ounce sodium hydroxide, 1.5 ounces sodium carbonate, and 4 ounces sodium silicate. The article may be allowed to stand in this alkaline solution for a short time until by observation or trial the grease is removed, after which it may be rinsed in water to remove all traces of the treating solution and products of the reaction. However, if desired, any other known way and compound for "degreasing" metal surfaces ordinarily may be employed for this purpose.

Applicants have found that it is impossible to electro-deposit an adhering coating of copper on stainless steel by any of the ordinary electroplating methods. According to the invention, before electro-plating the cleaned surface of the article that surface is treated electrolytically to prepare it for the plating operation. As satisfactory for this purpose the article, or portion thereof on which the copper is to be electro-deposited, is made a cathode, and preferably alternately an anode and a cathode, in a dilute acid. Applicants have found that in both the anodic and cathodic treatments best results will be secured by employing an electrolyte consisting of water containing 20% (by volume) of sulphuric acid, to which solution preferably are added 10% (by weight) of anhydrous sodium sulphate, and sufficient substance such as sodium chloride to cause the electrolyte to contain about 0.05% (by weight) of chloride radical.

Either or both the sodium sulphate and chloride radical may be omitted. It has been found, however, that sodium sulphate improves the conductivity of the electrolyte and also is electrolyzed to liberate sodium at the cathode when the article is made the cathode. This sodium reacts with the water to increase the amount of hydrogen liberated at the cathode, and thus cuts down the time necessary for treating the article. The chloride radical, it has been found, acts in the nature of a catalyst in respect to the effects produced when the article is a cathode, and when employed also acts to decrease the time necessary for treatment of the article. In practice the amount of sodium sulphate may be from 5 to 15% of the electrolyte, and the range of the chloride radical from 0.01 to 0.5% of the electrolyte.

The sulphuric acid concentration of the electrolyte employed in this preliminary treatment may vary from 5 to 50% (by volume) of the electrolyte. The time necessary for treating the article for a given current density it has been found decreases as the concentration of sulphuric acid is increased from 5 to 20% (by volume) of the electrolyte, but no substantial decrease in time has been observed by increasing the sulphuric acid concentration above 20%.

When the article is made the anode it has been found that best results will be secured with current densities of from 300 to 350 amperes per square foot, although smaller and larger ranges, say from 250 to 500 amperes per square foot of anode surface, may be employed. The total time of treating the article as an anode decreases as the current density is increased. This total time is such that the article as treated until etching of the surface begins, as shown by a "satin surface" just beginning to form on the article. Ordinarily the total time of this treatment will be from 15 to 45 seconds depending upon the current density employed within the range of from 250 to 500 amperes per square foot of anode surface.

Preferably much lower current densities are employed when the article is made the cathode. Preferably a current density of from 100 to 175 amperes per square foot of cathode surface is employed, although the density may be increased up to about 500 amperes per square foot. The necessary time of treatment decreases with the current density, and ordinarily this time will be from 30 seconds to 3 minutes depending upon the current density.

In treating the article anodically, as above described, plating off of its surface occurs slightly to roughen it, as evidenced by the production of a satin surface as above explained. This anodic treatment in some instances may be omitted, but without assurance of obtaining an adhering coating. If this omission is made, the surface may be roughened prior to cathodic treatment by other means, say by sand blasting, chemical etching, or the like.

When the article is made a cathode, hydrogen is evolved at its surface, which hydrogen acts as a deoxidizer and is believed to form a protective film of hydrogen on said surface. It is necessary, so far as has been observed, to make the article a cathode to secure satisfactory results, and to make it a cathode last in respect to it being made the anode no matter how many alternations occur.

The same electrolyte, which preferably is kept at about room temperature, preferably is employed when the article is both an anode and a cathode. The alternations in the current may be made by use of a suitable pole changing device as, for example, the familiar double-throw two-pole switch, a resistance being thrown into circuit with the article when it is the cathode for reducing the current density to the desired value. Ordinarily but one alternation need be made, the article first being made an anode until the satin surface begins to form, and then made a cathode. However, these operations may be performed in separate baths. It may be made an anode in one bath, and after the satin surface forms may be immediately rinsed with water and placed in a second bath in which it is made the cathode. In such case only the bath in which the article is made the cathode need contain either the sodium sulphate or the chloride radical.

The article, after being treated as above described, is removed from the bath, and, before it dries, is washed in water to take off the excess acid so as not to increase the acidity of the bath in which the subsequent electro-plating operations are performed. The article is removed to the plating bath preferably before it dries. In this condition, as above explained, it has its surface deoxidized and slightly roughened, and is believed to be coated with a protective film of hydrogen.

Best results it has been found will be secured in electro-plating the article by depositing thereon the copper in two distinct steps, the first involving the use of a high acid and low copper-content electrolyte, preferably sulphuric-acid copper-sulphate electrolyte, maintained at a relatively low temperature and with use of a plating current of relatively low density, and the second involving the use of a low acid and high copper-content sulphuric-acid copper-sulphate electrolyte maintained at a relatively high temperature and with use of a plating current of relatively high density. The first step is employed preferably to lay a thin, dense, strongly adhering coating, and the second step to build up that coating to the desired thickness. Ordinarily, to make a coating that is bonded to the base metal strongly enough to withstand high temperatures and stresses to which a cooking vessel is subjected in use, the first coating preferably is just slightly more than a so-called "flash" coating. With the ordinary cooking vessel the total thickness of the coating, after the second coating is laid, will be at least 0.02 inch to secure satisfactory results. For vessels with thicker walls, say those exceeding 0.05 inch in thickness, the thickness of the copper coating ordinarily should be increased proportionally to secure best results.

As a suitable example of the plating method, but without limitation thereto, the thin preliminary coating may be electro-deposited employing a 20% (by weight) sulphuric acid electrolyte containing about 10% (by weight) copper sulphate. However, from 5 to 40% (by weight) sulphuric acid may be employed with 5 to 20% (by weight) copper sulphate, the amount of copper sulphate varying inversely with the amount of acid. Preferably, in laying this coating, the article is rotated, or motion between it and the electrolyte otherwise caused.

With these electrolytes for the preliminary copper layer a current density of up to 100 amperes per square foot of cathode surface may be employed, the anode preferably being soluble as, for example, being formed of copper. Higher current densities, say up to 300 amperes per square foot of cathode surface, and high percentage copper sulphate electrolytes, could be employed, but it would be necessary under such conditions strongly to agitate the electrolyte to keep down "burning" of the copper layer, and such agitation would be liable to admit air and destroy that property of the stainless steel surface which enables the coating to be placed upon it.

It is important that in laying this preliminary coating the temperature of the electrolyte does not materially exceed about 80° F. If higher temperatures are employed it has been found that this preliminary "strike" plating will not adhere to the stainless steel surface.

Under the above conditions the preliminary coating is formed in from 20 seconds to 3 minutes depending upon the current density and the copper sulphate concentration of the electrolyte. The coating is dense and of fine grain, and strongly adheres to the stainless steel so as to be in substance integral therewith in the finished article.

Although it is preferred to employ an acid copper sulphate electrolyte for the preliminary strike coating other suitable electrolyte may be employed as, for example, a copper cyanide electrolyte, say one containing 3 ounces (by weight) of copper per gallon in the form of copper cyanide, with 0.5 to 3 ounces (by weight) of free hydrocyanide per gallon. With this latter electrolyte a slightly higher temperature may be employed, say from 110 to 130° F.

The preliminary step of electro-plating could be continued to lay a coating of the desired thickness in the finished article, but would involve such time as to be economically prohibitive. Consequently, for laying the remainder of the coating, preferably the article is transferred from the bath just mentioned to a second bath without permitting it to dry, or without rinsing it if the preliminary coating is deposited from a copper sulphate electrolyte. It has been found that, to secure good results, if the article is accidentally permitted to dry at this stage of the process it will be necessary thoroughly to clean the copper surface with an acid preparatory to continuing the plating operation.

Preferably the second bath consists of about 10% (by weight) sulphuric acid electrolyte containing about 20% (by weight) copper sulphate. The sulphuric acid may, however, range from 5 to 15%, and the copper sulphate from 15 to 25% inversely with the amount of sulphuric acid. Preferably the electrolyte also contains from 2 to 4 ounces per gallon of aluminum sulphate to give a smoother surface to the finished copper coating.

The above mentioned electrolyte employed for laying the final copper coating is maintained preferably at a temperature of about 130° F. to increase the rate of deposition. Temperatures up to 150° F. may be employed, but preferably the temperature is not raised to above 130° F. to prevent the plating from becoming too coarse.

Current densities up to about 500 amperes per square foot may be employed, and for the higher ranges of current density preferably not only is the work rotated, or motion between it and the electrolyte otherwise caused, but the electrolyte is strongly agitated as, for example, by introducing into it a jet of air, or by pumping electrolyte against either or both the anode and cathode. It has been found that by relatively moving the work and electrolyte and agitating the latter a smoother coating is laid for a given current density, and that higher current densities may therefore be employed under these conditions.

The anode employed in this second step preferably is a soluble copper anode which, it has been found, imparts better physical properties to the coating than does an insoluble anode.

Copper, plated as above described, it has been found will adhere to the treated stainless steel even when plated on sheets and the same are bent back and forth at right angles until they fracture. In this connection it will be understood that severe flexing occurs in a cooking vessel when the bottom is heated and permitted to cool. Further, up to ordinary cooking temperatures, say 650° F., it has been found that the coating in respect to its bond with the stainless steel is strongly resistant to heat, and will not loosen under such conditions. It is dense and hard, and admirably withstands the rough treatment to which it is subjected when scoured by the housewife to clean it.

Figs. 1 and 2 illustrate one form of apparatus for use in preliminarily treating the surface of a stainless steel cooking vessel on the bottom and adjacent portions of which is to be electro-deposited the layer of copper or other good heat conductive material.

Referring to Figs. 1 and 2, the body 1 of electrolyte is contained in a suitable receptacle 3 as, for example, a lead pot, herein shown as supported by a table top 5 of wood, the table top having an opening 7 through which the pot extends for allowing the circumferential flange 9 at the top of the pot to rest upon the top of the table.

As shown in Figs. 1 and 2, supported in the pot 3 is a cup-shaped electrode, preferably of insoluble material such as lead, having the bottom wall 11 and side walls 13, the bottom wall being provided with a plurality of spaced perforations 15 distributed thereover, and the side walls being provided with a lower circumferential row of perforations 17 and an upper row of perforations 19, the bottom of the perforations 19 being at about the level of the electrolyte. As shown, the electrode is supported by a plurality of straps, made for example of lead, having the vertical portions 21 joined to the upper edge of the electrode and horizontal portions 23 which rest upon the flange 9 of the pot. Conveniently, one or more of these straps is connected to a lead 25 from one terminal of the source of plating electromotive force.

As illustrated, at one side of the pot the table top 5 supports a vertical standard 27 on which is slidably mounted an arm 29 adapted to be secured to the standard in adjusted positions vertically thereof by a set screw indicated at 31. At one end this arm 29 carries the vertical post 33, preferably of insulating material, to which is detachably secured the casing 35 of an electric motor, the rotary metal shaft 37 of the motor projecting vertically downward from the motor casing. This shaft extends through an elongated stationary metal sleeve 39 in contacting relation with the walls thereof, the sleeve being carried by a metal arm 41 in electrical communication therewith. As shown, the arm 41 has a vertical portion 43 which is rigidly joined to the arm 29 in insulated relation thereto and is placed in electrical communication with the other terminal of the source of plating electromotive force by a lead 45 so that the shaft 37 of the motor serves as part of the conductor leading to the cooking vessel V being treated.

As shown (Figs. 2 and 3), for joining the vertical portion 43 of the arm 41 to the arm 29, the portion 43 is provided at opposite sides thereof at its upper end with a pair of projections 47 embracing the arm 29. A pair of bolts 49, extending through aligned openings in the projections 47 and arm 29, serve to secure the latter and the vertical portion 43 of the arm 41 in assembled relation, the two being insulated from each other and from the bolts by suitable insulation 51 and 53. These bolts are employed also to secure the bases 55 of the terminal lugs 57 on the end of the lead 45 in electrical comunication with the vertical portion 43 of the arm 41, as will be clear from Fig. 3.

As illustrated, detachably joined to the end of the metal shaft 37 of the motor, by means of the metal sleeve 59 and set screws 61, is a second metal shaft 63. This latter shaft carries at its lower end, in electrical communication therewith, a chuck for supporting the cooking vessel V. As shown, the chuck, which preferably is formed of resilient sheet copper, has a bottom 65, to which the shaft 63 is joined, and has side walls formed with V-shaped splits 67 to form a circumferential series of spaced resilient prongs 69, the latter engaging the lower portions of the side walls of the cooking vessel for supporting it and placing it in electrical communication with the shaft 63.

In operation when the motor is energized the vessel V is rotated. Satisfactory results will be secured in the practice of the above described method when the speed of rotation is such as to give a linear speed at the outer periphery of the vessel corresponding to 150 to 300 R. P. M. for a vessel 7 inches in diameter. Other speeds, however, are not precluded.

The bottom of the vessel, which in practice may be spaced from the bottom of the cup-shaped electrode a distance of from about ½ to ¾ inch, when rotated, forms with that electrode a centrifugal pump which draws the electrolyte through the perforations 15 at the center portions of the cup-shaped electrode and forces it out of the perforations 17 and out of the perforations 15 adjacent the periphery of the electrode, thus circulating the electrolyte rapidly in contact with the bottom of the vessel. A certain portion of the electrolyte flows upward to discharge through the perforations 19, which latter serve as an overflow to maintain approximately constant the level of the electrolyte in the annular space between the vertical walls of the vessel and the cup-shaped electrode. By this means, for a purpose hereinafter described, the portions of the side walls of the vessel adjacent its bottom are treated.

Figure 6:
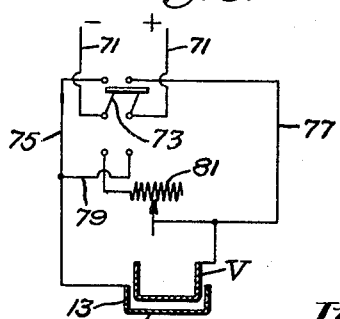
Fig. 6 is a schematic diagram of electrical connections employed in connection with the apparatus according to Figs. 1 and 2.

The circuit arrangement used in connection with the apparatus just described, when employed for treating the vessel as both a cathode and an anode, is schematically illustrated in Fig. 6. Referring to Fig. 6, the leads 71 from a source of plating electromotive force are connected to the center terminals of a double-throw two-pole switch schematically indicated at 73. The upper terminals of this switch are connected by leads 75 and 77 to the cup-shaped electrode 11, 13 and the vessel V respectively. The lower right hand terminal of the switch is connected by a lead 79 to the lead 75, and the lower left hand terminal to the lead 77 through a variable ohmic resistance 81. By this arrangement, when the switch 73 is thrown to connect the leads 71 to the upper terminals of the switch, a high plating current will be passed through the bath, under which conditions the vessel V is the anode. When the switch is thrown to connect the leads 71 to the lower terminals of the switch to make the vessel V the cathode the resistance 81 is thrown into circuit to cut down the plating current below that which it was when the vessel was the anode.

The depth the cooking vessel V is immersed in the electrolyte can be readily adjusted by moving the arm 29 up and down the standard 27. Preferably a stop collar 83, which may be secured to the standard 27 in adjusted positions by use of a set screw 85, is provided, so that by causing the arm 29 to rest against the collar when the arm is in its lower position all vessels V of similar size will be immersed in the electrolyte the same depth. At the completion of the operation the set screw 31 may be loosened and the arm 29 raised to move the vessel out of the electrolyte, thus permitting the vessel to be readily slipped out of engagement with the clutch on the end of the shaft 63.

One form of apparatus for electro-depositing the copper is illustrated by Figs. 4 and 5. This apparatus is similar to that heretofore described in respect to the support for the motor and vessel V, and the description of that part of the apparatus need not therefore be repeated.

As shown (Figs. 4 and 5), this last mentioned apparatus comprises a tank 87 formed, for example, of iron lined with insulating material 89 such as rubber. Along one edge of the tank, in insulated relation thereto, is shown a bus-bar 91 serving as one terminal of the source of plating electromotive force, the other terminal of which is constituted by the lead 45 in electrical communication with the vessel V.

Connected to the bus-bar, in electrical communication therewith, is an anode support, preferably in the form of a copper casting having a coating 93 of lead to protect it from corrosion and from plating off of its surface. As shown, this support comprises a horizontal portion 95 which rests upon and is bolted by means of bolts 97 to the bus-bar 91 in electrical communication therewith. Connected to the horizontal portion is a vertical portion 99 which projects downward into the electrolyte tank and carries a horizontal portion 101 to the outer end of which is secured a soluble anode 103 of copper or other metal to be plated on the vessel V. As shown, a disk 105, of relatively strong metal such as copper, has soldered thereto a disk 107 of lead which is "burned" to the lead lining 93 of the anode support. The soluble anode 103 on its lower side is provided with a recess 109 which receives the disk 105 to which it is detachably secured in electrical communication therewith by screws 111.

As illustrated, the anode 103 is provided with a plurality of spaced perforations 113 through which electrolyte is drawn into the space between the anode and vessel V when the latter is rotated.

The anode 103 and its supporting disks 105 and 107 as shown in Figs. 4 and 5 are provided with aligned central perforations 114 into which extends the end of a vertical pipe 115 formed of lead or other material inert with respect to the electrolyte. This pipe leads from a box 117, formed of similar material, which box is supplied with air under pressure by a pipe 119 of rubber or other material inert with respect to the electrolyte, the amount of air admitted to the box being controlled, and when desired the air being cut off, by a valve not shown. The box, as shown, is supported by a bracket 121 of lead or other material inert with respect to the electrolyte carried by the tank preferably in insulated relation thereto. At the top of the pipe 115 is a small hole 125, say one about 1/16 of an inch in diameter, which discharges the air in an upward direction toward the vessel V. This air causes agitation of the electrolyte and eliminates the possibility of the existence of quiescent spots in the electrolyte adjacent the center of the bottom of the rotating vessel, which spots, if they existed, might cause "burning" of the copper being deposited. Further agitation of the electrolyte is caused by the same being drawn through the perforations 113 and 114 of the anode when the vessel is rotated, and being discharged outward from the space between the anode and the vessel at the periphery of the anode. Still further agitation of the electrolyte is caused by providing the top of the box 117 with fine holes 127, say about 1/16 of an inch in diameter, through which air is discharged.

It will further be understood that the temperature of the electrolyte may be controlled by varying the amount of air admitted. It will also be understood that by moving the electrolyte and vessel relative to each other a scouring effect is produced which improves the physical properties of the copper by making it of fine grain. In laying the preliminary "strike" coating of copper in the above described method it will be understood that the air supply is interrupted to prevent oxidization of the treated stainless steel surface and thus cause the copper to adhere as hereinbefore explained.

It will be observed from Fig. 1 that the extreme lowermost portions of the side walls 129, and curved corner portions 131 which join the side walls to the bottom 133 of the cooking vessel V, are treated by the preliminary operation to permit their being electro-plated with copper. As will be clear from Fig. 4, the corner portions 131 and adjacent side wall portions are more remote from the anode 103 than is the bottom 133. In consequence of this, the copper coating 135 laid is of diminishing thickness as it extends from the bottom 133 of the vessel over the corner portions 131 to the side walls thereof, until substantially the coating terminates in approximately a feather edge merging at 137 with the stainless steel surface at about where the corner portions merge into the side walls, as illustrated in Fig. 7. As shown, however, Fig. 7 is more or less approximate, and in practice the edge of the coating may be positioned somewhat differently from there shown, depending upon the extent of the area treated by the preliminary electrolytic treatment and the depth of immersion of the article and current density during the plating operations. The coating described provides the vessel with a copper coating on its lower exterior surface portions, the edges of which coating are free from projecting corners, and thus not only improves the appearance of the article but eliminates any shoulders or cracks at which peeling off of the copper might start by mechanical action, or at which grease and dirt might accumulate or enter to start peeling by corrosive action of the copper. Any slight irregularities which may exist at the edges of the copper layer as a result of the plating operation may ordinarily be readily removed by a buffing operation. It will also be observed that rotating the vessel eliminates any variations in the effective lengths of current paths from the anode to different portions of the vessel having a symmetrical relation, and that as a consequence the coating, in respect to thickness, and at its edges, is laid substantially symmetrically with respect to the vessel.

It will be understood that within the scope of the appended claim wide deviations may be made from the forms of the invention herein described without departing from the spirit of the invention.

We claim:

A cooking vessel or the like having bottom and adjacent side wall portions with an exteriorly convex wall portion of material radius joining the two, which portions present a continuous exterior surface of stainless steel, a layer of electrolytically deposited copper deposited immediately on said surface substantially integral therewith, said layer having a relatively thick portion extending over said bottom surface, the marginal portion of said layer extending around said convex wall portion and being of progressively decreasing thickness and having an electrolytically deposited edge portion of material width and attenuated thickness merging into said stainless steel surface along a substantially continuous regular line at a distance above said bottom surface many times greater than the thickness of the copper layer on said bottom surface, the radius of said convex portion being many times greater than the thickness of the copper layer on said bottom surface.

JAMES M. KENNEDY.
ARTHUR P. KNIGHT.
HAROLD J. LEE.